Oct. 19, 1943.    F. B. FILLO    2,332,212
THERMOSTAT
Filed March 5, 1941
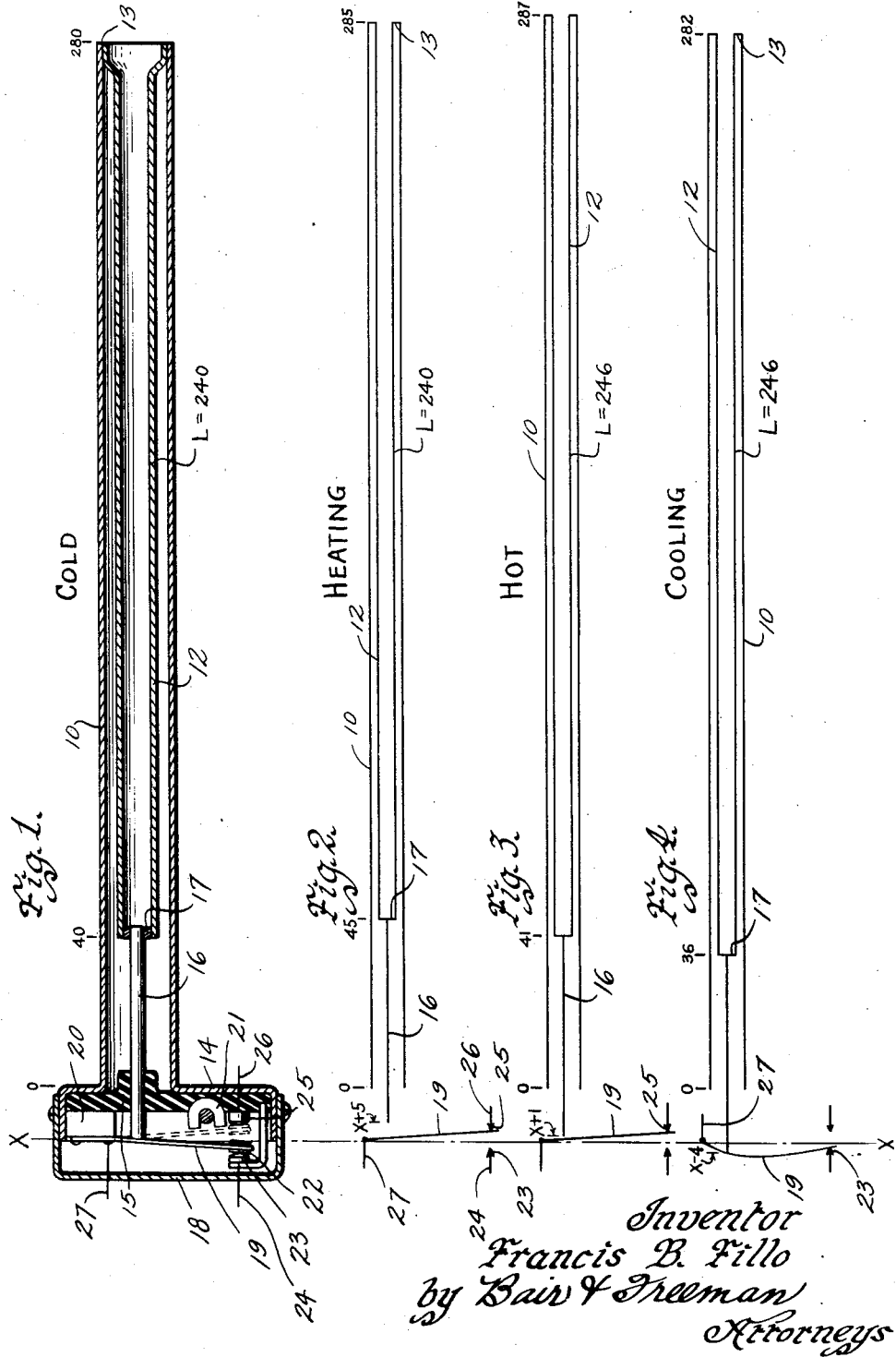
Inventor
Francis B. Fillo
by Bair & Freeman
Attorneys Patented Oct. 19, 1943

2,332,212

UNITED STATES PATENT OFFICE 2,332,212

THERMOSTAT

Francis B. Fillo, St. Louis, Mo., assignor to Penn Electric Switch Co., Goshen, Ind., a corporation of Iowa Application March 5, 1941, Serial No. 381,887

4 Claims. (Cl. 200—137)

My present invention relates to a thermostat wherein thermostatic elements operate a control device such as a switch in accordance with the rate and direction of temperature change affecting the thermostat.

One object of the invention is to provide a thermostat which is simple, durable and inexpensive to manufacture, and which may be substituted for the usual combustion or stack switch having a "slip" or "friction" connection.

A further object is to provide a thermostat wherein an increase of temperature affecting the temperature responsive elements thereof will substantially immediately operate a switch or other control device from its initial position to an opposite position and will effect maintenance of the switch in such opposite position while the temperature responsive elements are heated, the arrangement being such that the switch is returned substantially immediately to its initial position upon any cooling of the temperature responsive elements and remains in such initial position while the temperature responsive elements are cold.

Still a further object is to provide a pair of temperature responsive elements arranged to move an actuating member for a control switch or the like as a resultant of differential action between the elements, such that the direction of temperature change affecting the elements determines the position of the control switch without the necessity of providing a slip connection as in the usual type of "stack switch."

Another object is to provide a thermostat in which one temperature responsive element is predominantly responsive to temperature changes and another temperature responsive element differentially related to the first one is predominantly responsive through thermal conduction from the first temperature responsive element whereby a desired result of response of the control switch to the direction of temperature change is the controlling factor as distinguished from the usual type of thermostat in which the control switch assumes one position when the thermostat is hot and another position when it is cold.

The foregoing, other and further objects of the invention will be apparent to those skilled in the art to which this invention appertains, by reference to the following description, accompanying drawing and appended claims. One embodiment of the invention is illustrated in the accompanying drawing, in which the views thereof are as follows:

Figure 1 is a cross sectional view through a thermostat embodying my invention, showing the parts in "cold" position; and Figures 2, 3 and 4 are diagrammatic views thereof, showing the parts respectively in "heating," "hot," and "cooling" positions.

On the accompanying drawing I have used the reference numerals 10 and 12 to indicate temperature responsive elements. The elements 10 and 12 may take the form of outer and inner metal tubes and preferably have substantially the same coefficient of expansion. When the thermostat is to be used for combustion chamber or stack installation the tubes may be made of stainless steel or the like, preferably with a relatively high coefficient of expansion at high temperatures to secure the desired magnitude of operation for an actuating rod 16.

The outer or left hand end of the tube 10 is illustrated as having a wall member 14 which may be positioned against the outer surface of a combustion chamber or stack with the inner or right hand end projecting into the chamber or stack so as to respond to temperature changes therein. The inner end of the inner tubular element 12 is secured as by brazing or welding to the inner end of the outer element 10 as indicated at 13. The requisite at 13 is that the joint be of such character that it readily conducts heat.

The actuating rod 16 is preferably made of a material which is substantially invariable in length regardless of temperature changes. It should be capable of withstanding relatively high temperatures when the structure is used as a stack switch, and for this purpose may be made of stainless steel having a high percentage of nickel. An operating connection between the actuating rod 16 and the outer end of the tube 12 may consist of a bushing 17 welded or brazed to the rod and the tube.

The tube 12 is necessarily shorter than the tube 10 for an important reason which will hereinafter appear. By way of example, when the parts are cold the tube 10 may have a length of 280 units and the tube 12 may have a length of 240 units, as indicated on the drawing. This makes the outer end of the inner tube 12 assume a position at 40 units on the scale selected for illustration.

The actuating rod 16 may operatively coact with any type of control device. I have shown a switch structure wherein a panel 15 of insulating material is mounted on the wall 14 and carries a switch arm 19 mounted on an insulating block 20 and cooperating with contacts 23 and 25. Preferably the switch arm 19 should have a snap action feature and I have provided for such by having the arm 19 of magnetic material and a permanent magnet 21 to cooperate therewith to provide such snap action. The contacts 23 and 25 are adapted to coact with a contact 22 of the switch arm 19 in its initial position shown by solid lines in Figure 1, and its "opposite" position shown by dotted lines therein. Current carrying wires 24, 26 and 27 are shown connected with the contacts 23 and 25 and the switch arm 19. The switch thus illustrated may be used in an oil burner circuit such as the one shown in the Shaw Patent No. 2,080,580 in place of the combustion switch CS of said patent.

*Practical operation*

Assuming the parts of the thermostat as starting from the "cold" position of Figure 1, when the combustion chamber or stack heats up, the outer tubular element 10 will first be affected by the rising temperature. For instance, the tube 10 may increase in length five units, as shown in Figure 2, which makes its total length 285 units. Since the element 12 is enclosed in the element 10 it will be affected only by conduction through the connection 13. Accordingly, its length may remain 240 units while the element 10 is increasing in length five units, thereby causing the connection 17 to move to the position indicated as 45 units.

Assuming that the left hand end of the rod 16 is at a position indicated by the line X—X, when the parts are cold, such end of the rod will move to the position indicated as X+5 in Figure 2. This permits the switch arm 19 to move from its initial position to its opposite position with snap action as a result of the effect of the magnet 21 on the switch arm.

After the heat of the element 10 has been conducted to the element 12 its length will also increase. For instance, in Figure 3 the extreme "hot" position of the elements is shown wherein the tube 10 has lengthened seven units. The tube 12 being of less length and of the same coefficient of expansion will lengthen, for instance, six units. This will make the position of the actuating end of the rod 16 assume a position at X+1 which permits the switch 19 to remain closed in its opposite position against the contact 25.

When, however, the temperature affecting the elements 10 and 12 starts reducing, the length of the element 10 will first shorten as to the length indicated as 282 units in Figure 4 ("cooling"), thus making the actuating end of the rod 16 move in a return direction to a position indicating as X—4. The position of the parts in this figure is a result of the element 12 still remaining at 246 units of length because of the drop in temperature not yet affecting it.

Finally, when the element 10 is "cold," as in Figure 1, and the element 12 lagging behind it is also "cold," the initial position of the parts will be assumed, leaving the switch arm 19 in engagement with the contact 23.

The various units of lengthening and shortening have been selected merely by way of example, and to show how a rising temperature will effect movement of the switch to its operating position while a falling temperature will effect movement of the switch to its initial position without the necessity of having a slip connection of any kind. Some of the features of construction that make such operation of the switch possible are the arrangement of the tubes 10 and 12, so that one is predominantly responsive to the controlling temperature and the other one is predominantly responsive through thermal conduction to the temperature of the first element, the second one being shorter to insure movement of the switch to its operating position and to insure that it will remain there while the thermostat is being heated and while it is hot with reverse operation of the switch to its initial position effected during cooling of the thermostat and while it is in cold position. As an alternative construction the tubes 10 and 12 may be made of the same length and the tube 10 have a greater coefficient of expansion to secure the same results. Any arrangement of a control device or switch may be operated by the actuating rod 16.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a thermostat, an outer tubular element and an inner tubular element, both formed of material having substantially the same coefficient of expansion, means for anchoring the outer end of said outer tubular element with the element projecting into a combustion chamber, said inner tubular element having its inner end connected in thermal conducting relation to the inner end of said outer tubular element and its outer end free to move relative to said anchoring means, said inner tubular element being shorter than said outer tubular element, a switch located in stationary relation to said anchoring means and an operative connection, formed of material of substantially invariable length regardless of temperature changes, between said outer end of said inner tubular element and said switch whereby, during heating of said combustion chamber and during the period that the combustion chamber is hot, said switch is moved to a position opposite its initial position when cold, and said switch is returned to its initial position during subsequent cooling of said combustion chamber and during the period that the combustion chamber is cold.

2. In a thermostat, an outer tubular element and an inner tubular element, means for anchoring the outer end of said outer tubular element with the element located for response to combustion temperature changes, said inner tubular element having its inner end connected in thermal conducting relation to the inner end of said outer tubular element and its outer end free to move relative to said anchoring means, a control device located in stationary relation to said anchoring means and an operative connection between said outer end of said inner tubular element and said control device whereby said device is moved to a position opposite its initial position during heating of said combustion chamber and during the period that the combustion chamber is hot, and is returned to its initial position during subsequent cooling of said combustion chamber and during the period that the combustion chamber is cold.

3. In a thermostat, a pair of telescopically arranged tubular elements, both formed of material having substantially the same coefficient of expansion, means for anchoring the outer end of the outer tubular element with the element located for response to temperature changes, the inner tubular element having its inner end connected in thermal conducting relation to the inner end of said outer tubular element and its outer end free to move relative to said anchoring means, a control switch located in stationary relation to said anchoring means and an operative connection between said free end of said inner tubular element and said control switch whereby the control switch is moved to one circuit controlling position during a rise of temperature and during the period that the temperature remains high, and said control switch is returned to its initial circuit controlling position during subsequent lowering of the temperature and during the period that the temperature remains low.

4. In a direction of temperature change stack thermostat, a pair of tubular temperature responsive elements, one of which is anchored at one end and free at its other end, said element being predominantly responsive to ambient temperature changes in a stack and the other one being completely enclosed by the first one and thereby laggardly responsive to such ambient temperature changes, said enclosed element being open at one end to the stack and thereby responsive to stack temperature changes within said enclosed element, a control device having an initial position when said elements are cold and an operative connection between said control device and said other element for effecting movement of said control device from said initial position during heating of said elements and while they are hot, and for effecting movement of said control device back to said initial position during cooling of said elements and while they are cold.

FRANCIS B. FILLO.